(12) United States Patent
Padhi et al.

(10) Patent No.: US 8,150,683 B2
(45) Date of Patent: Apr. 3, 2012

(54) APPARATUS, METHOD, AND COMPUTER PROGRAM FOR COMPARING AUDIO SIGNALS

(75) Inventors: Kabi P. Padhi, Singapore (SG); Sapna George, Singapore (SG)

(73) Assignee: STMicroelectronics Asia Pacific Pte., Ltd., Singapore (SG)

( * ) Notice: Subject to any disclaimer, the term of this patent is extended or adjusted under 35 U.S.C. 154(b) by 2599 days.

(21) Appl. No.: 10/700,872

(22) Filed: Nov. 4, 2003

(65) Prior Publication Data

US 2005/0096899 A1 May 5, 2005

(51) Int. Cl.
*G10L 19/00* (2006.01)
(52) U.S. Cl. .................. 704/216; 704/217; 704/218
(58) Field of Classification Search .................. 704/503, 704/216–218; 381/56; 700/94; 434/407; 84/601–602, 634, 609–610
See application file for complete search history.

(56) References Cited

U.S. PATENT DOCUMENTS

| | | | |
|---|---|---|---|
| 5,565,639 A * | 10/1996 | Bae ............................. 84/477 R |
| 5,641,927 A * | 6/1997 | Pawate et al. ................... 84/609 |
| 5,719,344 A * | 2/1998 | Pawate ............................ 84/609 |
| 5,774,851 A * | 6/1998 | Miyashiba et al. ........... 704/252 |
| 5,845,247 A * | 12/1998 | Miyasaka ..................... 704/267 |
| 5,890,187 A * | 3/1999 | Asghar ............................. 711/4 |
| 6,944,510 B1 * | 9/2005 | Ballesty et al. ................. 700/94 |
| 2004/0093202 A1 * | 5/2004 | Fischer et al. ............... 704/216 |
| 2005/0273326 A1 * | 12/2005 | Padhi et al. .................... 704/231 |

\* cited by examiner

*Primary Examiner* — Devona Faulk
*Assistant Examiner* — George Monikang

(57) ABSTRACT

An apparatus, method, and computer program are capable of receiving and cross-correlating a first audio signal and a second audio signal. This produces a cross-correlated signal, which is used to identify a plurality of parameters associated with at least one of the first and second audio signals. The parameters are used to generate an indicator identifying an extent to which the first and second audio signals match.

25 Claims, 5 Drawing Sheets

APPARATUS, METHOD, AND COMPUTER PROGRAM FOR COMPARING AUDIO SIGNALS

TECHNICAL FIELD

This disclosure is generally directed to audio systems and more specifically to an apparatus, method, and computer program for comparing audio signals.

BACKGROUND

Many conventional audio systems process and compare audio signals. For example, conventional karaoke systems compare an audio signal representing a singer's voice to an audio signal representing an original song. This allows the karaoke systems to identify how well a singer sings the original song. As another example, language-learning software typically compares a signal representing a speaker's voice to a signal representing the proper pronunciation of words. This allows the language-learning software to identify how well the speaker pronounces words in a particular language.

Some of these audio systems use simplistic algorithms for comparing audio signals. For example, some audio systems simply compare the frame energies of the audio signals. In effect, these systems compare the loudness of the audio signals, which does not provide an accurate comparison of the actual contents of the signals. Other audio systems use overly complex algorithms, such as fast Fourier transformation techniques. These techniques are often computationally intensive and do not compare the actual contents of the audio signals.

SUMMARY

This disclosure provides an apparatus, method, and computer program for comparing audio signals.

In one aspect, an apparatus includes a cross correlator operable to receive a first audio signal and a second audio signal and to cross correlate the first and second audio signals, producing a cross-correlated signal. The apparatus also includes at least one parameter identifier operable to receive the cross-correlated signal and to identify a plurality of parameters associated with at least one of the first and second audio signals. In addition, the apparatus includes a score generator operable to receive the plurality of parameters and generate an indicator identifying an extent to which the first and second audio signals match.

In another aspect, a method includes receiving a first audio signal and a second audio signal and cross-correlating the first and second audio signals to produce a cross-correlated signal. The method also includes identifying a plurality of parameters associated with at least one of the first and second audio signals using the cross-correlated signal. In addition, the method includes generating an indicator identifying an extent to which the first and second audio signals match using the plurality of parameters.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
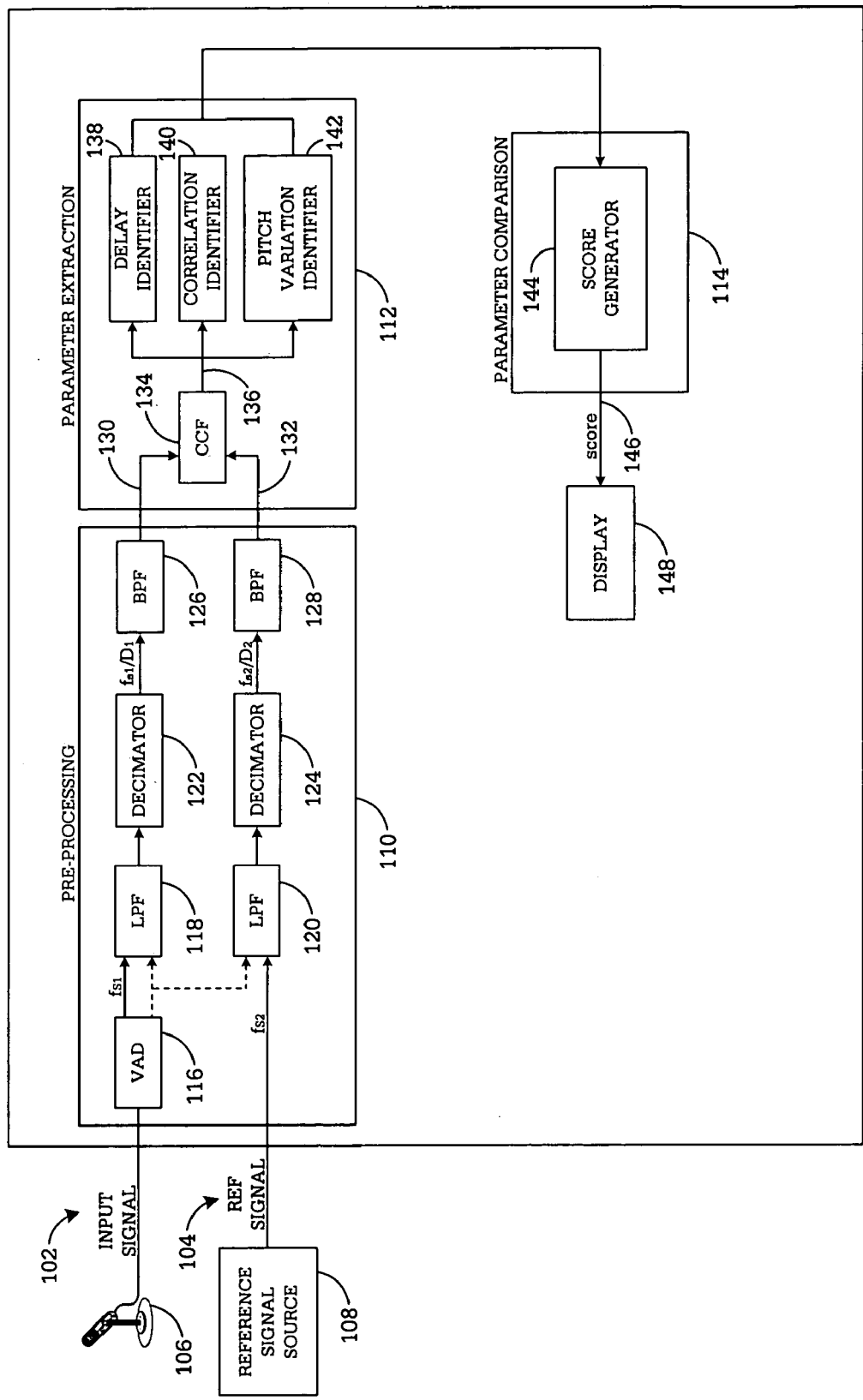
FIG. 1 illustrates an example audio apparatus according to one embodiment of this disclosure.

FIG. 1 illustrates an example audio apparatus 100 according to one embodiment of this disclosure. The apparatus 100 shown in FIG. 1 is for illustration only. Other embodiments of the apparatus 100 may be used without departing from the scope of this disclosure.

In one aspect of operation, the apparatus 100 receives audio signals, such as an input signal 102 and a reference signal 104. The apparatus 100 cross-correlates the audio signals and uses the cross correlation to identify various characteristics or parameters of the audio signals. For example, the cross correlation may be used to identify a variation of pitch between the signals 102, 104. The cross correlation may also be used to identify a delay between the signals 102, 104. In addition, the cross correlation may be used to identify an amount of correlation between the signals 102, 104. Using the identified characteristics, the apparatus 100 generates a score or other indicator identifying the extent to which the signals 102, 104 match.

In the illustrated example, the apparatus 100 receives an input signal 102 and a reference signal 104. The input signal 102 and the reference signal 104 represent audio signals to be compared by the apparatus 100. In this example, the input signal 102 is supplied by a microphone 106, and the reference signal 104 is supplied by a reference signal source 108. In a particular embodiment, the input signal 102 is produced by a microphone 106 used by a singer, and the reference signal 104 represents an original song provided by a compact disc (CD) player. In another particular embodiment, the input signal 102 is produced by a microphone 106 used by a student, and the reference signal 104 represents a proper pronunciation of words to be spoken by the student. This represents two possible uses of the apparatus 100. However, the illustrated input signal 102 and reference signal 104 could be replaced by any suitable audio signals provided by any suitable source or sources.

The signals 102, 104 may have any suitable format. For example, in some embodiments, the signals 102, 104 represent Pulse Code Modulated (PCM) signals. In particular embodiments, the input signal 102 includes 12,000 samples per second, while the reference signal 104 includes 48,000 samples per second. Other formats and sampling rates could also be used.

As shown in FIG. 1, the apparatus 100 includes a pre-processing section 110, a parameter extraction section 112, and a parameter comparison section 114. In general, the pre-processing section 110 prepares the signals 102, 104 for comparison, the parameter extraction section 112 identifies characteristics of the signals 102, 104, and the parameter comparison section 114 uses the characteristics to generate a score.

In the illustrated example, the pre-processing section 110 includes a voice activity detector (VAD) 116 coupled to the microphone 106. In this document, the term "couple" and its derivatives refer to any direct or indirect communication between two or more elements, whether or not those elements are in physical contact with one another.

Figure 7:
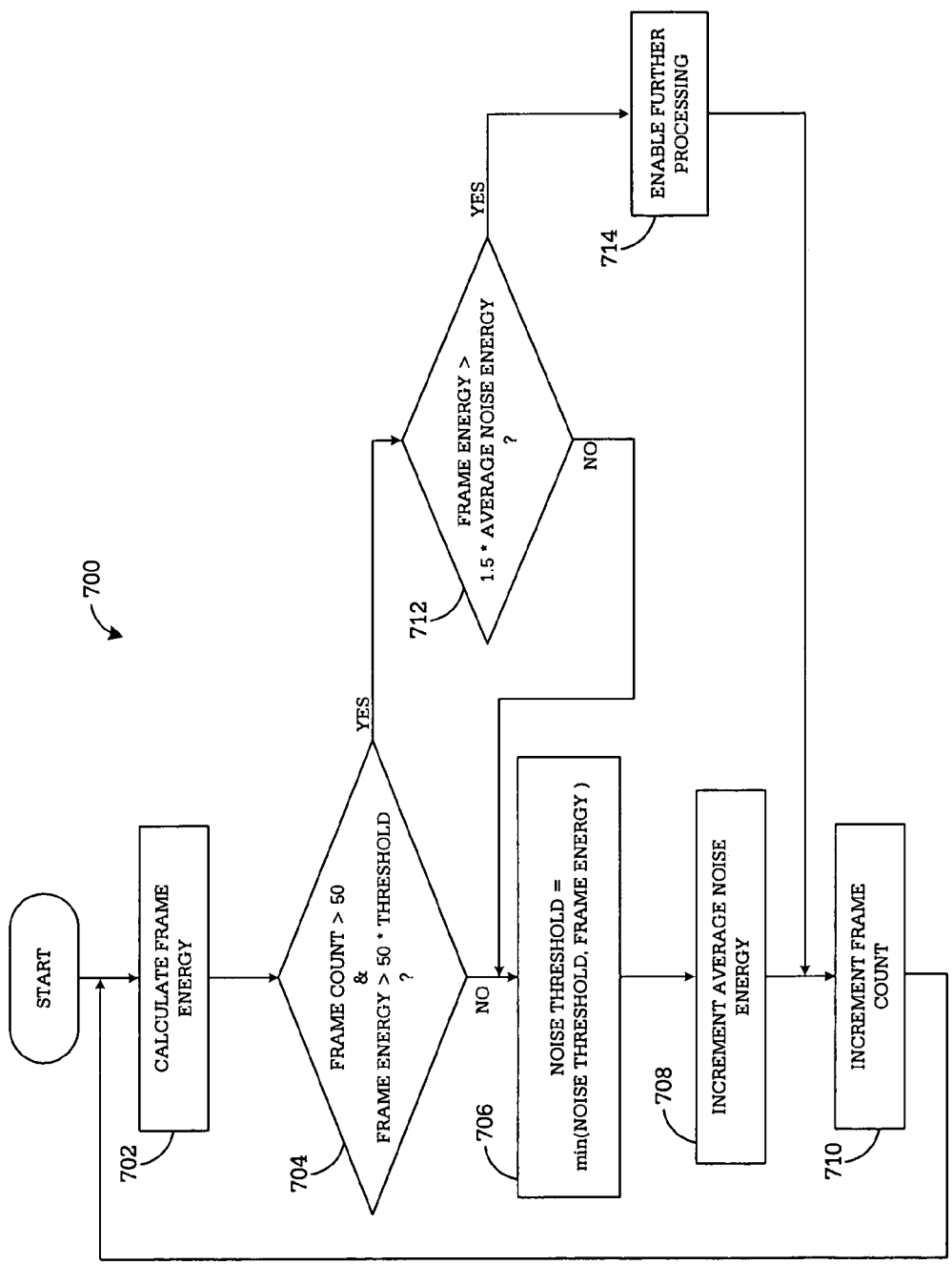
FIG. 7 illustrates an example method for detecting a voice in an input signal according to one embodiment of this disclosure.

In this example, the voice activity detector 116 detects when the input signal 102 received from the microphone 106 contains audio information representing a voice. For example, when the microphone 106 is activated, a speaker may or may not begin speaking into the microphone 106. The voice activity detector 116 analyzes the information in the input signal 102 and determines whether the input signal 102 represents a voice. If a voice is detected, the voice activity detector 116 signals other components in the apparatus 100 to begin processing the input signal 102 and the reference signal 104. One technique for determining whether an input signal 102 represents a voice is shown in FIG. 7, which is described below. The voice activity detector 116 includes any hardware, software, firmware, or combination thereof for detecting a voice in an audio signal.

In the pre-processing section 110, the input signal 102 is supplied to a filter 118, and the reference signal 104 is supplied to a filter 120. The filters 118, 120 filter the signals 102, 104 before the signals 102, 104 are processed further. Each filter 118, 120 includes any hardware, software, firmware, or combination thereof for filtering a signal. As an example, the filters 118, 120 may represent anti-aliasing low pass filters. As a particular example, the filters 118, 120 may represent anti-aliasing low pass filters having a cut-off frequency of 3 kHz. In some embodiments, the filters 118, 120 do not process the signals 102, 104 until the voice activity detector 116 detects a voice in the input signal 102.

The filter 118 is coupled to a decimator 122, and the filter 120 is coupled to a decimator 124. The decimators 122, 124 decimate the input signal 102 and the reference signal 104, which lowers the sampling frequency of the signals 102, 104. For example, the decimator 122 may decimate the input signal 102 by selecting and outputting every other sample in the input signal 102. In some embodiments, the decimator 122 decimates the input signal 102 by a first factor $D_1$, and the decimator 124 decimates the reference signal 104 by a second factor $D_2$. In these embodiments, if the input signal 102 has a frequency of $f_{S1}$, the decimated input signal 102 has a frequency of $f_{S1}/D_1$. Similarly, if the reference signal 104 has a frequency of $f_{S2}$, the decimated reference signal 104 has a frequency of $f_{S2}/D_2$. The decimators 122, 124 may decimate the signals 102, 104 by any suitable factors. In particular embodiments, the decimators 122, 124 decimate the signals 102, 104 so that the decimated signals 102, 104 have a frequency of 6 kHz. As an example, the input signal 102 and reference signal 104 may have sampling rates of 12,000 samples per second and 48,000 samples per second, respectively. If the decimated signals should have a frequency of 6 kHz, the decimator 122 has a decimation factor $D_1$ of two, and the decimator 124 has a decimation factor $D_2$ of eight. Each decimator 122, 124 includes any hardware, software, firmware, or combination thereof for decimating a signal 102, 104.

A filter 126 is coupled to the decimator 122, and a filter 128 is coupled to the decimator 124. The filters 126, 128 filter the decimated input signal 102 and decimated reference signal 104. The filters 126, 128 filter the decimated signals 102, 104 before the decimated signals 102, 104 are processed further. Each filter 126, 128 includes any hardware, software, firmware, or combination thereof for filtering a signal. As an example, the filters 126, 128 may represent band pass filters. As a particular example, the filters 126, 128 may represent infinite impulse response (IIR) filters that band limit the decimated signals 102, 104 to 1 kHz, which helps to attenuate frequencies above 1.5 kHz.

The filters 126, 128 produce two pre-processed signals, a pre-processed input signal 130 and a pre-processed reference signal 132. The pre-processed signals 130, 132 are supplied to the parameter extraction section 112.

The parameter extraction section 112 includes a cross correlator (CCF) 134. The cross correlator 134 receives the pre-processed signals 130, 132 and cross-correlates the pre-processed signals 130, 132. This produces a cross-correlated signal 136. The cross correlator 134 may use any suitable technique to cross correlate the pre-processed signals 130, 132. The cross correlator 134 includes any hardware, software, firmware, or combination thereof for cross-correlating two or more signals.

The cross-correlated signal 136 is provided to a delay identifier 138, a correlation identifier 140, and a pitch variation identifier 142. The identifiers 138-142 use the cross-correlated signal 136 to identify various characteristics associated with the input signal 102 and/or the reference signal 104.

The delay identifier 138 estimates the delay between the signals 102, 104 using the cross-correlated signal 136. For example, the input signal 102 could represent a singer's voice, and the reference signal 104 could represent an original song. The singer may sing words before or after the words occur in the original song, and the delay identifier 138 identifies this difference or delay. The delay identifier 138 uses any suitable technique for identifying a delay between two signals. As described below, in some embodiments, the delay identifier 138 identifies the maximum value in the cross-correlated signal 136, and the delay is associated with that maximum value. The delay identifier 138 includes any hardware, software, firmware, or combination thereof for identifying a delay between signals.

The correlation identifier 140 identifies the amount of correlation between the signals 102, 104 using the cross-correlated signal 136. For example, the reference signal 104 could represent a song, and the amount of correlation between the signals 102, 104 represents whether a singer sung the correct lyrics in the song. In some embodiments, the correlation identifier 140 identifies the amount of correlation between the signals 102, 104 in the form of a percentage. The correlation identifier 140 uses any suitable technique for identifying the amount of correlation between signals. The correlation identifier 140 includes any hardware, software, firmware, or combination thereof for identifying the amount of correlation between two or more signals. As a particular example, the correlation identifier 140 may include a normalizer that normalizes the cross-correlated signal 136. The normalized value of the cross-correlated signal 136 represents an indication of the percentage match between the signals 102, 104.

The pitch variation identifier 142 identifies the amount of pitch variation between the signals 102, 104 using the cross-correlated signal 136. For example, the reference signal 104 could represent a song, and a singer may sing at a different pitch than the original song. The pitch variation identifier 142 identifies the variation in pitch between the original song and the singer's voice. The pitch variation identifier 142 uses any suitable technique for identifying the pitch variation between signals. As described below, in some embodiments, the pitch variation identifier 142 uses the periodicity of the cross-correlated signal 136 to identify the pitch variation. The pitch variation identifier 142 includes any hardware, software, firmware, or combination thereof for identifying the amount of pitch variation between two or more signals.

The identified delay, amount of correlation, and pitch variation are supplied to the parameter comparison section 114. The parameter comparison section 114 includes a score generator 144. The score generator 144 processes the identified delay, correlation, and pitch variation and generates a score 146 using these values. The score 146 represents an indicator identifying an extent to which the signals 102, 104 match. The score 146 could, for example, represent a value between 0 and 100. In some embodiments, the input signal 102 and the reference signal 104 may be divided into frames, and a score 146 may be produced for each frame. The score generator 144 may also dynamically adjust the score 146 for one frame based on previous frames. The score generator 144 uses any suitable technique for generating a score 146. One technique for generating a score 146 is described below with respect to FIG. 6. The score generator 144 includes any hardware, software, firmware, or combination thereof for generating a score 146 using the information generated by the parameter extraction section 112. Although this has described the score generator 144 using the identified delay, correlation, and pitch variation to generate a score 146, other or additional characteristics could also be used to generate a score 146.

The score 146 produced by the score generator 144 is presented to a user or other person or people on a display 148. The display 148 represents any suitable device or structure for presenting a score 146. Although FIG. 1 illustrates the display 148 as forming part of the apparatus 100, the display 148 could reside external to the apparatus 100. Also, the score 146 could be used in other ways, such as by storing the score 146 in a database or other storage medium.

The various components shown in FIG. 1 may represent any suitable hardware, software, firmware, or combination thereof. As an example, the components in the pre-processing section 110, parameter extraction section 112, and parameter comparison section 114 may represent software routines executed by one or more processors in the apparatus 100.

Although FIG. 1 illustrates one example of an audio apparatus 100, various changes may be made to FIG. 1. For example, the functional division of the apparatus 100 is for illustration only. Various components can be omitted or combined and additional components can be added according to particular needs. As particular examples, the voice activity detector 116 could be omitted, and the reference signal source 108 could form part of the apparatus 100. Also, the filters 118, 126 may be combined, and the filters 120, 128 may be combined. Further, the input signal 102 and reference signal 104 could represent analog or digital signals. If one or both signals 102, 104 are analog signals, one or more amplifiers and/or one or more analog-to-digital converters could be used to convert the signals 102, 104 into a digital format. In addition, the apparatus 100 could form part of a larger apparatus or system, such as a karaoke system or a computer system.

Figure 2:
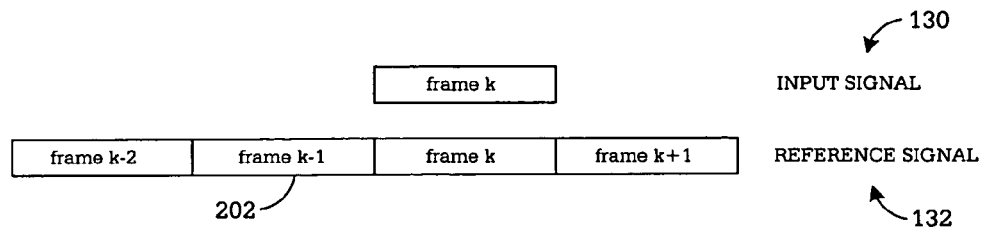
FIG. 2 illustrates example audio signals according to one embodiment of this disclosure.

FIG. 2 illustrates example audio signals according to one embodiment of this disclosure. In particular, FIG. 2 illustrates the pre-processed input signal 130 and the pre-processed reference signal 132 used by the parameter extraction section 112 of FIG. 1. The signals 130, 132 shown in FIG. 2 are for illustration only. Other signals 130, 132 having other formats may be used by the audio apparatus 100 of FIG. 1 without departing from the scope of this disclosure.

In the illustrated example, each signal 130, 132 is divided into one or more frames 202 of audio information. Each frame 202 may represent any suitable amount of audio information. For example, in some embodiments, each frame 202 represents 64 samples. Any other frame size could be used by the apparatus 100.

As described above, the apparatus 100 decimates the input signal 102 and the reference signal 104 to produce the pre-processed signals 130, 132. As a result, the samples in a frame 202 of the pre-processed input signal 130 correspond to a larger number of samples in the input signal 102. If the decimator 122 decimates the input signal 102 by a factor of $D_1$ and a frame 202 has N samples, the frame 202 represents $N*D_1$ samples in the input signal 102. Similarly, the samples in a frame 202 of the pre-processed reference signal 132 correspond to a larger number of samples in the reference signal 104. If the decimator 124 decimates the reference signal 104 by a factor of $D_2$, the frame 202 represents $N*D_2$ samples in the reference signal 104.

Even though FIG. 2 shows that the frames 202 labeled "frame k" are synchronized (same starting and ending positions), the information contained in the frames 202 may not be. For example, if the apparatus 100 is used to score a karaoke singer's performance, the singer may not be singing in synchronization with the original song. In other words, the singer might sing the lyrics before or after he or she is supposed to sing them. This leads to a difference or delay between the contents of the signals 130, 132, which means that the lyrics sung by the singer may not overlap the lyrics in the original song.

This delay may cause problems in conventional systems. For example, the singer could sing all lyrics of a song perfectly but sing them two frames 202 early or late. If a conventional system attempted to cross-correlate the signals 130, 132 frame by frame, the information in the frames would not be synchronized, and the correlation may indicate that the singer sung incorrect lyrics.

The cross correlator 134 helps to compensate for this delay by correlating samples from the pre-processed input signal 130 within a certain window of time and samples from the pre-processed reference signal 132 within a larger window of time. For example, as shown in FIG. 2, the cross correlator 134 correlates 64 samples (one frame) from the pre-processed input signal 130 and 256 samples (four frames) from the pre-processed reference signal 132. This produces a cross-correlated signal 136 associated with the frame 202 ("frame k") in the pre-processed input signal 130, and the cross-correlated signal 136 is used to generate a score 146 for that frame 202. Another cross-correlated signal 136 could then be generated for another frame 202 ("frame k+1") in the pre-processed input signal 130 using four frames 202 ("frame k−1" through "frame k+2") in the pre-processed reference signal 132.

This allows the cross correlator 134 to take into account the fact that the input and reference signals 102, 104 may not be synchronized. Even if a singer sings lyrics of a song two frames early or late, the cross correlator 134 can process the signals 102, 104 correctly. A larger or smaller window could also be used during the correlation, such as when the cross correlator 134 correlates one frame 202 from the pre-processed input signal 130 and two frames 202 from the pre-processed reference signal 132. Although this has described the use of a particular number of samples by the cross correlator 134, any suitable number of samples from the input signal 130 and reference signal 132 may be correlated.

Although FIG. 2 illustrates one example of audio signals processed by the apparatus 100, various changes may be made to FIG. 2. For example, each signal 130, 132 could include any number of frames 202 having any number of samples. Also, other signals with other formats could be processed by the apparatus 100.

Figure 3:
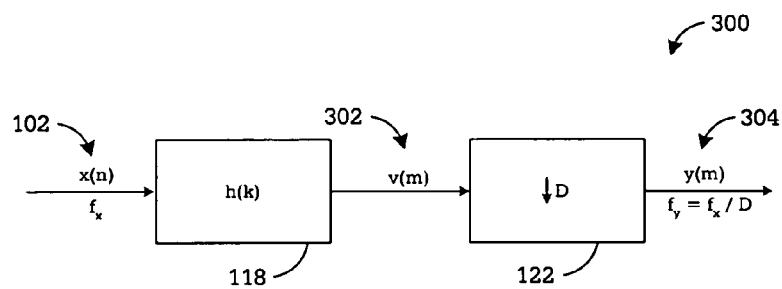
FIG. 3 illustrates an example model of a filter and a decimator in the audio apparatus according to one embodiment of this disclosure.

FIG. 3 illustrates an example model 300 of a filter 118 and a decimator 122 in the audio apparatus 100 according to one embodiment of this disclosure. The model 300 shown in FIG. 3 is for illustration only. Embodiments of the apparatus 100 operating under any other model may be used without departing from the scope of this disclosure. Also, the same or similar model may be used to represent the filter 120 and the decimator 124 in the apparatus 100.

As shown in FIG. 3, the filter 118 receives an input signal 102 and produces an intermediate filtered signal 302. The filter 118 has a filter coefficient of h(k). In this example, x(n) represents the time domain input signal 102, where the input signal 102 has a frequency of $f_x$. Also, v(m) represents the time domain intermediate filtered signal 302.

The decimator 122 receives the intermediate filtered signal 302 and produces a decimated input signal 304. In this example, y(m) represents the time domain decimated input signal 304. The decimator 122 decimates the intermediate filtered signal 302 by a factor of D. This may include, for example, the decimator 122 selecting and outputting every Dth value from the intermediate filtered signal 302. This gives the decimated input signal 304 a frequency $f_y$ of $f_x/D$. The operation of the decimator 122 may be represented by the following equation:

$$y(m) = v(mD) = \sum_{k=0}^{\infty} h(k)x(mD - k). \qquad (1)$$

Reducing the sampling rate of the input signal 102 by selecting every Dth value may result in an aliased version of the input signal 102 with a folding frequency of $f_S/2D$. In some embodiments, to avoid aliasing, the bandwidth of the input signal 102 is reduced to a maximum of $f_S/2D$ by the filter 118. Ideally, the filter 118 (and filter 120) satisfies the following condition:

$$H(w) = \begin{cases} 1, & |f| \le f_s/2D \\ 0, & \text{otherwise} \end{cases}. \qquad (2)$$

Although FIG. 3 illustrates one example of a model 300 of a filter 118 and a decimator 122 in the audio apparatus 100, various changes may be made to FIG. 3. For example, the filter 118 could have any suitable response.

Figure 4:
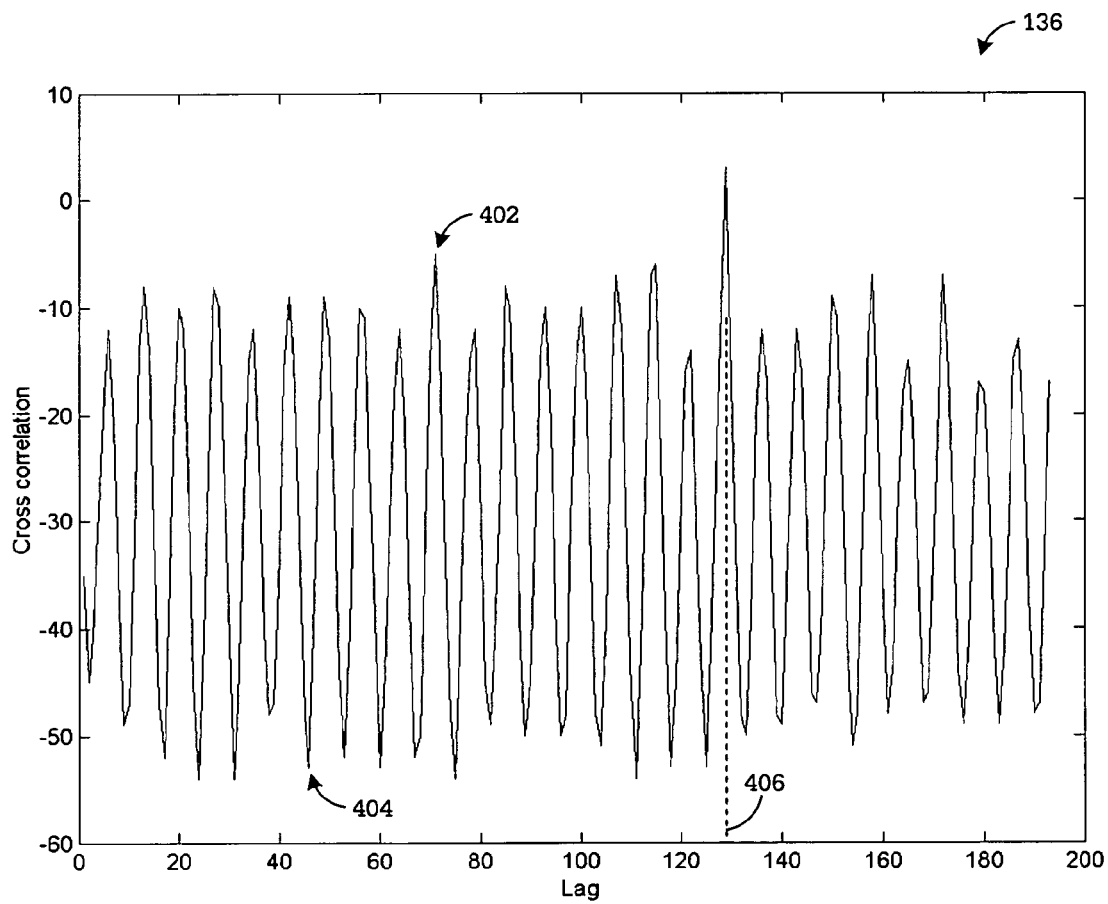
FIG. 4 illustrates an example cross correlation of two audio signals according to one embodiment of this disclosure.

FIG. 4 illustrates an example cross correlation of two audio signals according to one embodiment of this disclosure. In particular, FIG. 4 illustrates a cross-correlated signal 136 produced by the cross correlator 134 using one frame 202 representing an input signal and four frames 202 representing a reference signal. The cross-correlated signal 136 shown in FIG. 4 is for illustration only. Other cross-correlated signals could be produced by the apparatus 100 without departing from the scope of this disclosure.

As shown in FIG. 4, the cross-correlated signal 136 is highly periodic in nature with a large number of positive peaks 402 and negative peaks 404. In this example, the cross-correlated signal 136 is produced using audio signals representing a human voice and a reference voice. The periodic nature of the cross-correlated signal 136 is at least partially due to the harmonic nature of human voices. When there is a match in the harmonic frequencies of the input voice and the reference voice, there is a corresponding peak 402, 404 in the cross-correlated signal 136.

The cross-correlated signal 136, which represents the cross correlation $Y(\tau)$ of two independent signals 130, 132, can be expressed by the equation:

$$Y(\tau) = \frac{1}{N} \sum_{n=0}^{N-1} y_1(n) * y_2(n+\tau), \qquad (3)$$

where N represents the size of the frames 202, $\tau$ represents the lag or delay between the signals 130, 132, and $y_1(n)$ and $Y_2(n)$ represent the signals 130, 132. In some embodiments, the value of $\tau$ varies between 0 and (w−1)*N+1, where w represents the number of frames 202 from the pre-processed reference signal 132 cross-correlated with one frame 202 from the pre-processed input signal 130. For example, if 256 samples (four frames 202) from the pre-processed reference signal 132 are used during the cross-correlation, the value of $\tau$ varies between 0 and (4−1)*N+1, or 3N+1.

To remove the dependency of the score 146 on the loudness of the signals 102, 104, the cross-correlated signal 136 may be normalized. In some embodiments, the cross-correlated signal 136 is normalized using the root mean square of the energies of both the input signal 102 and the reference signal 104. The root mean square of the energy may be defined using the following equation:

$$E_y = \sqrt{\sum_{n=0}^{N-1} y^2(n)} \qquad (4)$$

where $E_y$ represents the root mean square energy and y(n) represents one of the signals 130, 132.

The cross-correlated signal 136 in FIG. 4 is provided to the delay identifier 138, correlation identifier 140, and pitch variation identifier 142 in the apparatus 100. The identifiers 138-142 use the cross-correlated signal 136 to identify different parameters or characteristics of the input signal 102 and reference signal 104.

As an example, the delay identifier 138 identifies a delay between the pre-processed signals 130, 132. In some embodiments, the delay identifier 138 identifies the delay by identifying the maximum value in the cross-correlated signal 136. As shown in FIG. 4, the maximum value is shown by a line 406.

In this example, the maximum value occurs at a lag of 128. However, this does not necessarily mean that the input signal 102 is lagging behind the reference signal 104. In fact, in this example, a lag of 128 indicates that the signals 102, 104 are synchronized. To produce the cross-correlated signal 136 shown in FIG. 4, the cross correlator 134 correlated the samples in one frame 202 of an input signal with the samples in four frames 202 of a reference signal. As shown in FIG. 2, if the frames 202 labeled "frame k" are synchronized, the synchronization would begin at the beginning of the third frame 202. Assuming each frame 202 has 64 samples, the synchronization begins 128 samples into the reference signal shown. In this example, a lag of 128 indicates synchronization, and a lag that varies from 128 indicates a lack of synchronization.

The correlation identifier 140 also processes the cross-correlated signal 136 to identify the amount of correlation between the signals 102, 104. In some embodiments, the correlation identifier 140 identifies the normalized value of the cross-correlated signal 136, where the normalized value represents the percentage match between the two signals 130, 132.

The pitch variation identifier 142 identifies the amount of variation in the pitch of the signals 102, 104 using the cross-correlated signal 136. The periodicity of the cross-correlated signal 136 acts as an indicator of the pitch variation in the signal 102 with respect to the signal 104. A constant period may indicate that the variation is at a minimum, and fluctuations in the period may indicate variations in the input signal 102.

In some embodiments, the pitch variation identifier 142 measures the periodicity of the cross-correlated signal 136 over successive frames 202. In particular embodiments, the pitch variation identifier 142 identifies the periodicity of the cross-correlated signal 136 by measuring the distance between positive peaks 402 and the distance between negative peaks 404 in the cross-correlated signal 136. This technique is described below with respect to FIG. 5.

Although FIG. 4 illustrates one example of a cross correlation of two audio signals, various changes may be made to FIG. 4. For example, any cross-correlated signal 136 could be produced and used by the apparatus 100 of FIG. 1.

Figure 5:
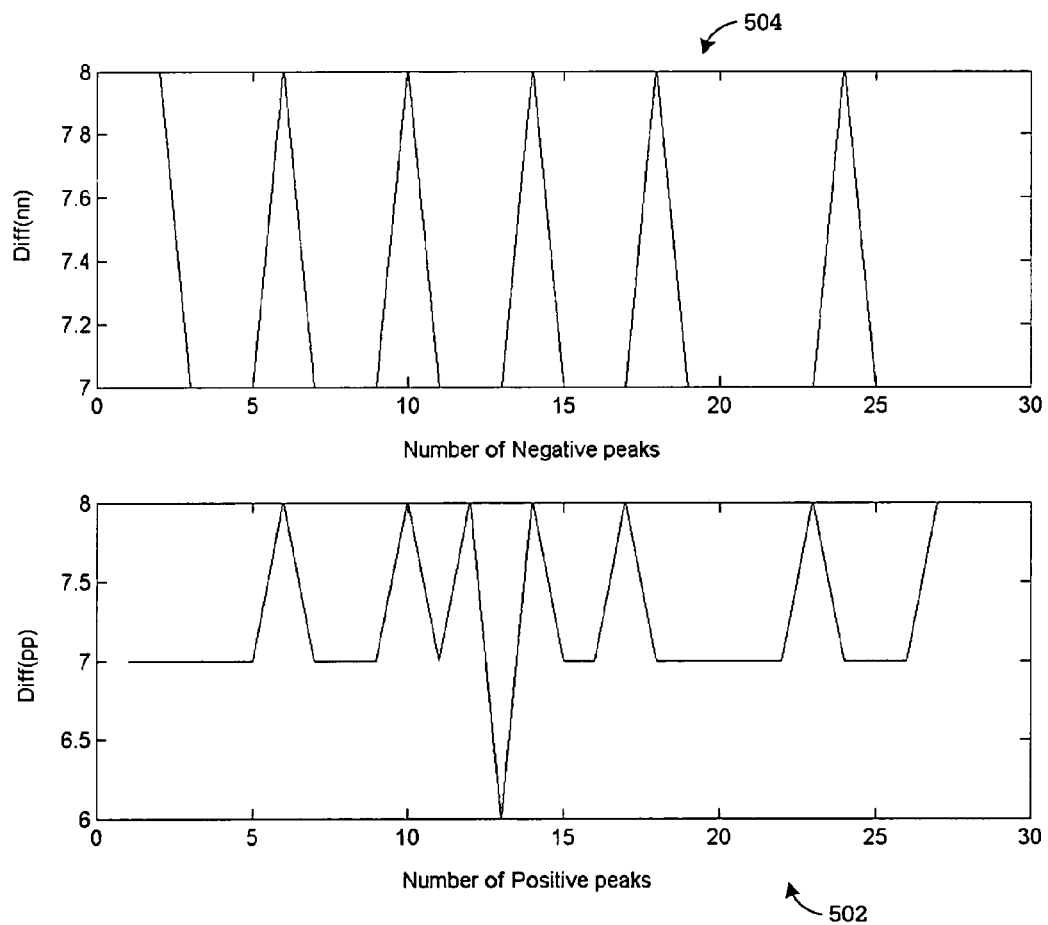
FIG. 5 illustrates an example mechanism for identifying a pitch variation between two audio signals according to one embodiment of this disclosure.

FIG. 5 illustrates an example mechanism for identifying a pitch variation between two audio signals according to one embodiment of this disclosure. In particular, FIG. 5 illustrates a technique for identifying the periodicity of a cross-correlated signal 136 using distances 502 between positive peaks 402 and distances 504 between negative peaks 404. The distances 502, 504 shown in FIG. 5 are for illustration only. Other distances could be identified using any cross-correlated signal 136 without departing from the scope of this disclosure.

The cross-correlated signal 136 shown in FIG. 4 is highly periodic. The periodicity of the cross-correlated signal 136 is an indicator of the pitch variation between the signals 102, 104. The periodicity of the cross-correlated signal 136 is estimated by measuring the distance 502 (Diff$_{pp}$) between positive peaks 504 and the distance 504 (Diff$_{nn}$) between negative peaks 404.

Using the distances 502 as an example, FIG. 5 shows that the distances between positive peaks 402 in FIG. 4 vary from six and eight lags. When the distances 502 remain constant (at seven lags), the periodicity of the positive peaks 402 is also constant. This indicates that the pitch variation between the signals 130, 132 is at a minimum. When the distances 502 between positive peaks 402 fluctuate (to six or eight lags), this indicates that the pitch variation between the signals 130, 132 has increased.

The peaks 402, 404 in the cross-correlated signal 136 may be identified using any suitable technique. In some embodiments, the positive peaks 402 are identified by locating points in the cross-correlated signal 136 where Y(τ−1)<Y(τ)>Y(τ+1), and the negative peaks 404 are identified by locating points in the cross-correlated signal 136 where Y(τ−1)>Y(τ)<Y(τ+1). Using these criteria, the peaks 402, 404 in the cross-correlated signal 136 of FIG. 4 are identified, and the distances between them are shown in FIG. 5.

The pitch variation identifier 142 may use the information in FIG. 5 to identify the estimated pitch variation. In some embodiments, the pitch variation identifier 142 uses the following equation to identify the estimated variation in pitch:

$$Pitch_{est}^{l} = \frac{\sum Diff_{pp}}{k_p} + \frac{\sum Diff_{nn}}{k_n} \tag{5}$$

where $k_p$ represents the number of positive peaks 402, $k_n$ represents the number of negative peaks 404, l represents the lth frame 202, and Pitch$_{est}$ represents the estimated coincidental harmonic frequency (or pitch variation) for the lth frame 202.

Although FIG. 5 illustrates one example of a mechanism for identifying a pitch variation between two audio signals, various changes may be made to FIG. 5. For example, the specific distances 502, 504 are for illustration only.

Figure 6:
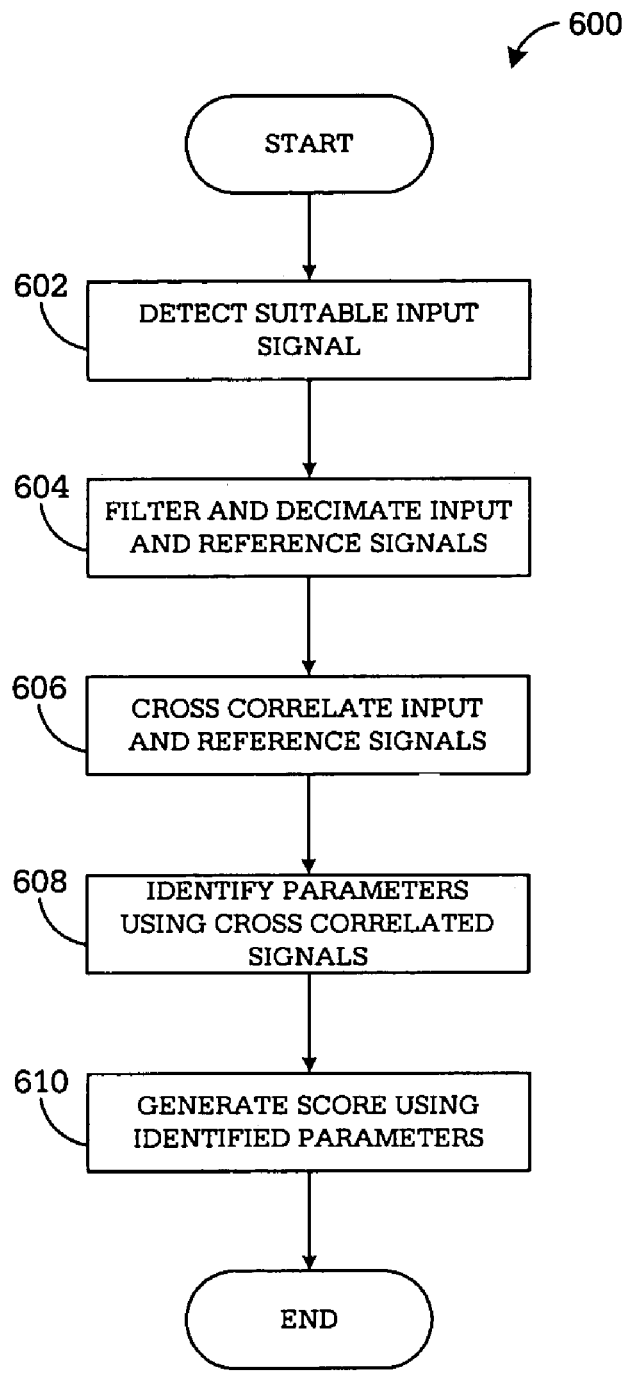
FIG. 6 illustrates an example method for comparing audio signals according to one embodiment of this disclosure.

FIG. 6 illustrates an example method 600 for comparing audio signals according to one embodiment of this disclosure. For ease of explanation, the method 600 is described with respect to the audio apparatus 100 of FIG. 1. The method 600 could be used by any other suitable apparatus or system.

The apparatus 100 detects a suitable input signal at step 602. This may include, for example, the voice activity detector 116 receiving an input signal 102 and determining that the input signal 102 contains audio information representing a voice. This may also include the voice activity detector 116 instructing the filters 118, 120 to begin processing the input signal 102 and a reference signal 104.

The apparatus 100 filters and decimates the input and reference signals at step 604. This may include, for example, the filters 118, 120 performing low pass filtering on the signals 102, 104. This may also include the decimators 122, 124 decimating the filtered input signals 102, 104. This may further include the filters 126, 128 band pass filtering the decimated input signals 102, 104, which produces two pre-processed signals 130, 132.

The apparatus 100 cross-correlates the processed signals at step 606. This may include, for example, the cross correlator 134 correlating the pre-processed input and reference signals 130, 132 to produce a cross-correlated signal 136. The cross correlator 134 may correlate an equal number of samples from the pre-processed signals 130, 132. The cross correlator 134 could also correlate an unequal number of samples from the pre-processed signals 130, 132.

The apparatus 100 identifies a plurality of parameters using the cross-correlated signals at step 608. This may include, for example, the identifiers 138-142 using the cross-correlated signal 136 to identify a delay between the signals 130, 132, an amount of correlation between the signals 130, 132, and a pitch variation between the signals 130, 132. Other or additional parameters could also be identified.

The apparatus 100 uses the identified parameters to generate a score at step 610. The score identifies the extent to which the signals 102, 104 match. This may include, for example, the score generator 144 receiving the identified parameters from the identifiers 138-142 and generating the score using the parameters.

The score generator 144 may use any suitable technique to generate a score using the parameters. In some embodiments, the score generator 144 assigns different weights or levels of importance to the values produced by the identifiers 138-142. For example, when used in a karaoke system, the operator of the apparatus 100 may want a singer who incorrectly sings the lyrics of a song to receive a lower score 146 than a singer who sings at a variable pitch. In this example, a higher weight is assigned to singing the correct words, which can be determined using the delay and correlation values produced by the identifiers 138-140. The weights can be assigned in any suitable manner, such as having default values and allowing a user to assign custom values as desired.

In particular embodiments, the score generator 144 uses a two-stage scoring algorithm to determine a score 146. For example, the score generator 144 may generate a first score using the delay value and correlation value produced by the delay identifier 138 and correlation identifier 140. The score generator 144 may then generate a second score using the pitch variation value produced by the pitch variation identifier 142. The final score 146 may represent a sum of the first and second scores.

The following represents one example way in which the score generator 144 may generate a score 146. Various values used in this example are for illustration and explanation only. First, the score generator 144 generates a value α using the information from the delay identifier 138 and the correlation identifier 140. The value of α is determined using the formula:

$$\text{local\_maxout/max\_out.} \tag{6}$$

In this embodiment, local_maxout identifies the largest value of the cross-correlated signal within a certain range centered at the 128th lag, such as within a range of 125-131 (±3 lags from 128). Also, max_out identifies the largest value in the cross-correlated signal. In this example, the correlation identifier 140 outputs two values, one identifying a value for max_out and another identifying a value of local_maxout. Using the value of α, the score generator 144 selects a first score ($Score_1$) using Table 1.

TABLE 1

| Range | $Score_1$ |
|---|---|
| α ≧ 0.75 | 60 |
| 0.75 > α ≧ 0.5 | 50 |
| 0.5 > α ≧ 0.25 | 40 |
| 0.25 > α | 30 |

After that, the score generator 144 uses the information from the pitch variation identifier 142 to select a second score, which is added to the first score to produce the final score 146. In particular, the score generator 144 produces two values $\beta_1$ and $\beta_2$, which uses the estimated coincidental harmonic frequency for three successive frames 202 calculated using Equation 5. The score generator 144 uses the following equations to identify values for $\beta_1$ and $\beta_2$:

$$\beta_1 = \left| \frac{Pitch_{est}^{l-1} - Pitch_{est}^{l-2}}{Pitch_{est}^{l-2}} \right| \tag{7}$$

$$\beta_2 = \left| \frac{Pitch_{est}^{l} - Pitch_{est}^{l-1}}{Pitch_{est}^{l-1}} \right|. \tag{8}$$

Ideally, if the input signal 102 has a constant pitch, the deviation of the estimated coincidental harmonic frequency across the frames 202 should be small. Using the values of $\beta_1$ and $\beta_2$, the score generator 144 assigns a final score using Table 2. In Table 2, if both the "Range 1" condition and "Range 2" condition in the same line are satisfied, the final score is computed using the formula on that line. The formula adds the first score to a second score and produces the final score 146. In Table 2, the symbol denotes the logical OR operation.

TABLE 2

| Range 1 | Range 2 | Final Score |
|---|---|---|
| $\beta_1 < 0.2$ | $\beta_2 < 0.2$ | $Score_1 + 40$ |
| $\beta_1 \| \beta_2 < 0.2$ | $\beta_1 \| \beta_2 < 0.3$ | $Score_1 + 20$ |
| $\beta_1 \| \beta_2 < 0.3$ | $\beta_1 \| \beta_2 < 0.6$ | $Score_1$ |
| $\beta_1 \| \beta_2 \geq 0.3$ | $\beta_1 \| \beta_2 < 0.6$ | $Score_1 - 10$ |
| $\beta_1 \geq 0.6$ | $\beta_2 \geq 0.6$ | $Score_1 - 30$ |

By considering the two previous frames 202 in the computation of the final score 146, the score generator 144 averages out fluctuations in short time periods and provides a more reliable estimate of the quality of the input signal 102.

This represents one way to generate a score 146 for a single frame 202 in the pre-processed input signal 130. The score 146 for multiple frames could be used in any suitable manner. For example, the scores 146 could be averaged to produce an overall score for the input signal 102.

Although FIG. 6 illustrates one example of a method 600 for comparing audio signals, various changes may be made to FIG. 6. For example, the apparatus 100 could always process audio signals and not wait to detect a suitable input signal 102 at step 602.

FIG. 7 illustrates an example method 700 for detecting a voice in an input signal according to one embodiment of this disclosure. In particular, the method 700 is used by the voice activity detector 116 to determine when an input signal 102 suitable for processing has been received. For ease of explanation, the method 700 is described with respect to the audio apparatus 100 of FIG. 1. The method 700 could be used by any other suitable apparatus or system.

The voice activity detector 116 calculates the energy contained in a frame of an input signal at step 702. The frame in the input signal could have a size of $N*D_1$, where N represents the size of a frame 202 in the pre-processed input signal 102. In particular embodiments, the frame energy is determined using the formula:

$$E^l = \sum_{n=(l-1)*D_1 N+1}^{l*D_1 N} x(n)^2 \tag{9}$$

where l represents the lth frame of size $D_1*N$, and $E^l$ represents the frame energy of the lth frame.

The voice activity detector 116 determines whether the calculated frame energy represents a possible voice at step 704. This may include, for example, the voice activity detector 116 determining whether 50 frames of the input signal 102 have been received and whether the calculated frame energy is at least 50 times greater than a noise threshold. In this example, the first 50 frames of the input signal 102 are used to identify the noise threshold, and a decision as to whether a voice is present in the input signal 102 is not made during those 50 frames. While this example uses 50 frames, any other suitable number of frames could be used.

If either of the conditions at step 704 is not met, the voice activity detector 116 updates the noise threshold at step 706. This may include, for example, the voice activity detector 116 setting the noise threshold equal to the smaller of the previous noise threshold and the current frame energy.

The voice activity detector 116 increments an average noise energy value at step 708. In particular embodiments, the average noise energy value is determined using the formula:

$$E_n^a = \frac{1}{k}\sum_{l=1}^{k} E^l \quad (10)$$

where $E^a_n$ represents the average noise energy over k frames of the input signal 102.

The voice activity detector 116 increments a frame count at step 710. The frame count allows the voice activity detector 116 to determine when it has processed a threshold number (such as 50) of frames in the input signal 102. The voice activity detector 116 returns to step 702 to process another frame in the input signal 102.

Eventually, the voice activity detector 116 detects that the conditions at step 704 are satisfied. When that occurs, the voice activity detector 116 determines whether the frame energy for the current frame in the input signal exceeds the average noise energy value by a specified amount at step 712. This may include, for example, the voice activity detector 116 determining whether the frame energy for the current frame of the input signal 102 is greater than 1.5 times the average noise energy value.

If not, the voice activity detector 116 returns to step 706 to update the noise threshold. At this point, the apparatus 100 is still not processing the input signal 102. For example, the voice activity detector 116 could output a value of zero to the filters 118, 120, which prevents the filters 118, 120 from processing the input signal 102 and reference signal 104. The apparatus 100 could also be outputting a default score 146, such as a score of zero.

Otherwise, if the frame energy for the current frame in the input signal exceeds the average noise energy value by a specified amount, the voice activity detector 116 enables further processing of the input signal at step 714. This may include, for example, the voice activity detector 116 outputting a value of one to the filters 118, 120, which allows the filters 118, 120 to process the input signal 102 and reference signal 104. At this point, the remaining components in the apparatus 100 process the signals 102, 104 and output a score 146.

Although FIG. 7 illustrates one example of a method 700 for detecting an input signal, various changes may be made to FIG. 7. For example, the values of "50" in step 704 and "1.5" in step 712 are for illustration only. Other values could be used in these steps. Also, any other voice detection mechanism could be used in the apparatus 100, and the voice activity detector 116 could be omitted.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. As used herein, the term "software" means a computer program embodied on a tangible computer readable medium excluding carrier waves, transmission signals or any other kind of transitory computer readable medium.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
    a cross correlator operable to receive a first audio signal and a second audio signal, the cross correlator also operable to cross correlate a first time period of the first audio signal with a second time period of the second audio signal to produce a cross-correlated signal, where the second time period is larger than the first time period;
    at least one parameter identifier operable to receive the cross-correlated signal and identify a plurality of parameters associated with at least one of the first and second audio signals using the cross-correlated signal; and
    a score generator operable to receive the plurality of parameters and generate an indicator identifying an extent to which the first and second audio signals match.

2. The apparatus of claim 1, wherein the at least one parameter identifier comprises:
    a delay identifier operable to identify a delay between the first and second audio signals;
    a correlation identifier operable to identify an amount of correlation between the first and second audio signals; and
    a pitch variation identifier operable to identify a variation in pitch between the first and second audio signals.

3. The apparatus of claim 2, wherein the delay identifier is operable to identify the delay by identifying a maximum value in the cross-correlated signal, the correlation identifier is operable to identify the amount of correlation by normalizing the cross-correlated signal, and the pitch variation identifier is operable to identify the variation in pitch by identifying a coincidental harmonic frequency using the cross-correlated signal.

4. The apparatus of claim 2, wherein the score generator is operable to generate the indicator by:
    generating a first score using the delay between the first and second audio signals and the amount of correlation between the first and second audio signals;
    generating a second score using the variation in pitch between the first and second audio signals; and
    combining the first and second scores to produce a final score.

5. The apparatus of claim 1, wherein the first audio signal is associated with an input signal and the second audio signal is associated with a reference signal, the apparatus further comprising:
    a plurality of decimators operable to receive and decimate the input signal and the reference signal; and
    a plurality of filters operable to filter at least one of the input signal, the reference signal, a decimated input signal, and a decimated reference signal.

6. The apparatus of claim 5, wherein the plurality of filters comprise:
    a first anti-aliasing low pass filter operable to filter the input signal, a first of the decimators operable to decimate the filtered input signal;

a second anti-aliasing low pass filter operable to filter the reference signal, a second of the decimators operable to decimate the filtered reference signal;

a first band pass filter operable to filter the decimated input signal to produce the first audio signal; and a second band pass filter operable to filter the decimated reference signal to produce the second audio signal.

7. The apparatus of claim 1, further comprising a voice activity detector operable to detect a voice in the input signal, wherein the score generator is operable to generate the indicator in response to the voice activity detector detecting the voice in the input signal.

8. The apparatus of claim 1, wherein each of the first and second audio signals comprises a plurality of frames, and wherein the cross correlator is operable to correlate one frame from the first audio signal and multiple frames from the second audio signal to produce the cross-correlated signal.

9. The apparatus of claim 8, wherein the indicator identifies an extent to which the one frame from the first audio signal matches at least a portion of the multiple frames from the second audio signal.

10. A method, comprising:
receiving in an audio apparatus a first audio signal and a second audio signal;
cross-correlating by the audio apparatus a first time period of the first audio signal with a second time period of the second audio signal to produce a cross-correlated signal, where the second time period is larger than the first time period;
identifying by the audio apparatus a plurality of parameters associated with at least one of the first and second audio signals using the cross-correlated signal; and
generating by the audio apparatus an indicator identifying an extent to which the first and second audio signals match using the plurality of parameters.

11. The method of claim 10, wherein the plurality of parameters comprise:
a delay between the first and second audio signals;
an amount of correlation between the first and second audio signals; and
a variation in pitch between the first and second audio signals.

12. The method of claim 11, wherein identifying by the audio apparatus the plurality of parameters comprises:
identifying by the audio apparatus the delay by identifying a maximum value in the cross-correlated signal;
identifying by the audio apparatus the amount of correlation by normalizing the cross-correlated signal; and
identifying by the audio apparatus the variation in pitch by identifying a coincidental harmonic frequency using the cross-correlated signal.

13. The method of claim 11, wherein generating by the audio apparatus the indicator comprises:
generating by the audio apparatus a first score using the delay between the first and second audio signals and the amount of correlation between the first and second audio signals;
generating by the audio apparatus a second score using the variation in pitch between the first and second audio signals; and
combining by the audio apparatus the first and second scores to produce a final score.

14. The method of claim 10, wherein the first audio signal is associated with an input signal and the second audio signal is associated with a reference signal, the method further comprising:

decimating by the audio apparatus the input signal and the reference signal; and
filtering by the audio apparatus at least one of the input signal, the reference signal, a decimated input signal, and a decimated reference signal.

15. The method of claim 14, wherein filtering by the audio apparatus at least one of the signals comprises:
anti-alias low pass filtering by the audio apparatus the input signal;
anti-alias low pass filtering by the audio apparatus the reference signal;
band pass filtering by the audio apparatus the decimated input signal to produce the first audio signal; and
band pass filtering by the audio apparatus the decimated reference signal to produce the second audio signal.

16. The method of claim 10, further comprising detecting by the audio apparatus a voice in the input signal, wherein generating by the audio apparatus the indicator comprises generating the indicator in response to detecting the voice in the input signal.

17. The method of claim 10, wherein each of the first and second audio signals comprises a plurality of frames, the method further comprising:
cross-correlating by the audio apparatus the first and second audio signals comprises cross-correlating by the audio apparatus one frame from the first audio signal and multiple frames from the second audio signal to produce the cross-correlated signal.

18. A computer program operable to be executed by a processor, the computer program embodied on a non-transitory tangible computer readable medium and comprising computer readable program code for:
receiving a first audio signal and a second audio signal;
cross-correlating a first time period of the first audio signal with a second time period of the second audio signal to produce a cross-correlated signal, where the second time period is larger than the first time period;
identifying a plurality of parameters associated with at least one of the first and second audio signals using the cross-correlated signal; and
generating an indicator identifying an extent to which the first and second audio signals match using the plurality of parameters.

19. The computer program of claim 18, wherein the plurality of parameters comprise:
a delay between the first and second audio signals;
an amount of correlation between the first and second audio signals; and
a variation in pitch between the first and second audio signals.

20. The computer program of claim 19, wherein the computer readable program code for identifying the plurality of parameters comprises computer readable program code for:
identifying the delay by identifying a maximum value in the cross-correlated signal;
identifying the amount of correlation by normalizing the cross-correlated signal; and
identifying the variation in pitch by identifying a coincidental harmonic frequency using the cross-correlated signal.

21. The computer program of claim 19, wherein the computer readable program code for generating the indicator comprises computer readable program code for:
generating a first score using the delay between the first and second audio signals and the amount of correlation between the first and second audio signals;

generating a second score using the variation in pitch between the first and second audio signals; and combining the first and second scores to produce a final score.

22. The computer program of claim 18, wherein the first audio signal is associated with an input signal and the second audio signal is associated with a reference signal, the computer program further comprising computer readable program code for:

decimating the input signal and the reference signal; and filtering at least one of the input signal, the reference signal, a decimated input signal, and a decimated reference signal.

23. The computer program of claim 22, wherein the computer readable program code for filtering at least one of the signals comprises:

computer readable program code for anti-alias low pass filtering the input signal;

computer readable program code for anti-alias low pass filtering the reference signal;

computer readable program code for band pass filtering the decimated input signal to produce the first audio signal; and computer readable program code for band pass filtering the decimated reference signal to produce the second audio signal.

24. The computer program of claim 18, further comprising computer readable program code for detecting a voice in the input signal, wherein the computer readable program code for generating the indicator comprises computer readable program code for generating the indicator in response to detecting the voice in the input signal.

25. The computer program of claim 18, wherein each of the first and second audio signals comprises a plurality of frames, the computer readable program code comprising computer readable program code for cross-correlating one frame from the first audio signal and multiple frames from the second audio signal to produce the cross-correlated signal.

* * * * *